UNITED STATES PATENT OFFICE.

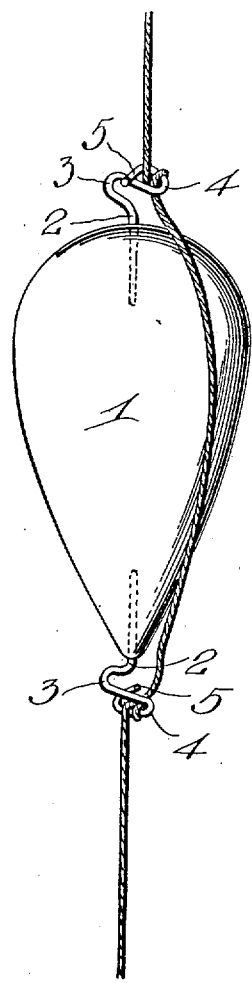
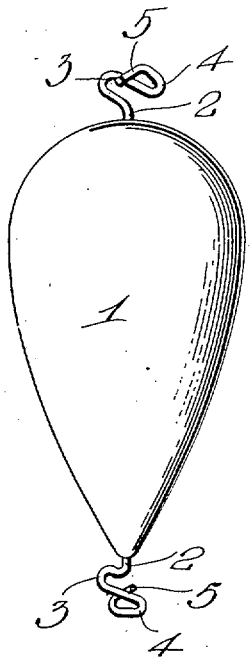
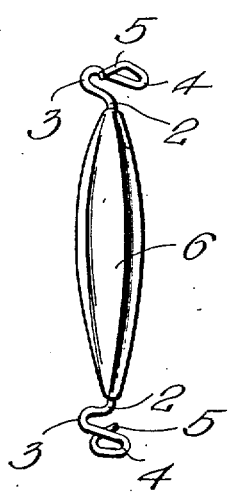

JOHN W. COLLEY AND EDWIN G. WALTER, OF ELKHART, INDIANA.

LINE-CONNECTING DEVICE FOR FLOATS AND SINKERS.

1,019,950. Specification of Letters Patent. Patented Mar. 12, 1912.

Application filed August 25, 1910. Serial No. 578,871.

*To all whom it may concern:*

Be it known that we, JOHN W. COLLEY and EDWIN G. WALTER, citizens of the United States, residing at Elkhart, in the county of Elkhart and State of Indiana, have invented certain new and useful Improvements in Line-Connecting Devices for Floats and Sinkers; and we do declare the following to be a full, clear, and exact description of the invention, such as will enable others skilled in the art to which it appertains to make and use the same.

This invention relates to improvements in line connecting devices for fishing lines, floats and sinkers.

The object of the invention is to provide a simple and inexpensive connecting device adapted to be applied to a float or to a sinker whereby the same may be quickly and securely attached or connected to any part of the fishing line.

With the above and other objects in view, the invention consists of certain novel features of construction, combination and arrangement of parts as will be more fully described and particularly pointed out in the appended claim.

In the accompanying drawings; Figure 1 is a perspective view of a float showing our improved connecting device applied thereto and illustrating the manner in which the device is engaged with the line; Fig. 2 is a similar view of the float and connecting device disengaged from the line; Fig. 3 is a perspective view of a sinker showing the connecting device applied thereto.

Referring more particularly to the drawings, 1 denotes a fishing line float which may be of any desired construction. On the opposite ends of the float are arranged my improved line connecting devices each of which is formed from a strip of wire bent intermediate its ends to form an attaching shank 2 which is forced into the float. The opposite end of the wire is bent to form a loop 3, which projects at right angles to the shank, and is then bent back upon itself to form a substantially V-shaped line engaging loop 4, which is disposed in a horizontal plane or transversely to the plane of the loop 3, the end of the wire extending across the loop 4 to form a guide finger 5 which aids in the engagement of the line with the clenching loop 4.

In applying the float to the line, the latter is drawn across the shoulder or rest formed by the upper side of the loop 3 and against the finger 5 with the rest between the line and the extremity of the finger. The line is then brought over the loop 3 and under the finger whereupon the continued pull thereon will carry it between the finger and the rest into the loop 4. The line is then again brought around to engage the finger and rest, this movement causing the line to loop itself about the side of the loop 4 so that, when it is a second time drawn under the finger and between the same and the rest, it will be tied around the loop as clearly shown in Fig. 1.

In Fig. 3 of the drawings is shown a sinker 6 having our improved connecting device applied to both ends thereof, said devices being constructed in the same manner as the devices on the float and the line is engaged therewith in the same manner as described in connection with the float. It will be noted that the connecting device at one end of the float and sinker have the guide fingers thereof projecting in opposite directions from the fingers of the devices at the opposite ends.

By means of the line connecting device herein shown and described a float or sinker may be readily secured to a line at any desired point and when engaged with the line in the manner described, will hold the float or sinker against slipping or casual disconnection from the line.

By forming the transverse loop 3 below the line holding-loop 4 we provide an extended transverse shoulder or rest against which the line may be readily placed and by which it may be supported until it has been tied to the line holding loop. The engagement of the line with the line-holding loop is thus facilitated and the slipping of the line from the guide finger in applying the loop to the float or sinker is prevented. The engagement of the line with the loop may be easily and rapidly accomplished by one hand with a single continuous motion and as the finger 5 lies upon the shoulder or rest presented by the loop 3 between the ends of the same, the said shoulder or rest serves as a guard to effectually prevent the finger being drawn out of place by the free length of the line or by extraneous elements and, consequently, the line will be effectually maintained in its operative position.

From the foregoing description taken in connection with the accompanying drawings, the construction and operation of the invention will be readily understood without requiring a more extending explanation.

Various changes in the form, proportion and the minor details of construction may be resorted to without departing from the principle or sacrificing any of the advantages of the invention as defined in the appended claim.

Having thus described our invention what we claim is:

A fishing tackle comprising a float with a line attachment therefor, consisting of a single length of wire having a straight shank adapted to be inserted in the end of the float, said wire bent S-shape at its intersection with the shank to provide a plurality of loops, the terminal of the wire being bent across the loops and contacting therewith and projecting therefrom.

In testimony whereof we have hereunto set our hands in presence of two subscribing witnesses.

JOHN W. COLLEY.
EDWIN G. WALTER.

Witnesses:
JACOB OBERHOLTZER,
DANIEL C. THOMAS.

Copies of this patent may be obtained for five cents each, by addressing the "Commissioner of Patents, Washington, D. C."